(12) United States Patent
Scharfe

(10) Patent No.: US 10,525,478 B2
(45) Date of Patent: Jan. 7, 2020

(54) COMMINUTING DEVICE

(71) Applicant: PMS Handelskontor GmbH, Hamburg (DE)

(72) Inventor: Felix Scharfe, Hamburg (DE)

(73) Assignee: PMS Handelskontor GmbH, Hamburg (DE)

( * ) Notice: Subject to any disclaimer, the term of this patent is extended or adjusted under 35 U.S.C. 154(b) by 962 days.

(21) Appl. No.: 15/022,497

(22) PCT Filed: Aug. 29, 2014

(86) PCT No.: PCT/EP2014/068389
§ 371 (c)(1),
(2) Date: Mar. 16, 2016

(87) PCT Pub. No.: WO2015/039855
PCT Pub. Date: Mar. 26, 2015

(65) Prior Publication Data
US 2016/0228879 A1  Aug. 11, 2016

(30) Foreign Application Priority Data
Sep. 19, 2013  (DE) .......................... 10 2013 110 352

(51) Int. Cl.
*B02C 13/18*  (2006.01)
*B02C 13/14*  (2006.01)
(Continued)

(52) U.S. Cl.
CPC .............. *B02C 13/18* (2013.01); *B02C 13/14* (2013.01); *B02C 13/16* (2013.01); *B02C 13/282* (2013.01);
(Continued)

(58) Field of Classification Search
CPC ......... B02C 13/14; B02C 13/16; B02C 13/18; B02C 13/00; B02C 13/28; B02C 13/282; B02C 13/286; B02C 13/288
(Continued)

(56) References Cited

U.S. PATENT DOCUMENTS 2,531,732 A * 11/1950 Hoffman .............. A01D 34/535
172/39
2,573,227 A * 10/1951 Sheeley .................. B02C 13/28
241/194
(Continued)

FOREIGN PATENT DOCUMENTS

CN  101282791  10/2008
CN  202356136  8/2012
(Continued)

OTHER PUBLICATIONS

Search Report dated Mar. 26, 2014 from German patent application No. DE102013110352.9.
(Continued)

*Primary Examiner* — Shelley M Self
*Assistant Examiner* — Smith Oberto Bapthelus
(74) *Attorney, Agent, or Firm* — K. David Crockett, Esq.; Crockett & Crockett, PC

(57) ABSTRACT

A device (10) for mechanically comminuting material conglomerates. The device includes a comminuting chamber (14) having a feed side and an outlet side, surrounded by a chamber wall with rotors (26, 28, 30) each including a rotor shaft and striking tools (38) extending radially into the comminuting chamber. The directions of rotation of the rotors (26, 28, 30) are opposite in at least two consecutive segments. An air stream device (31, 37, 39, 41) for leading a particle/air mixture out of the comminuting chamber (14) is arranged in connection with the comminuting chamber.

18 Claims, 2 Drawing Sheets

(51) Int. Cl.
  *B02C 13/16* (2006.01)
  *B02C 13/282* (2006.01)
  *B02C 13/286* (2006.01)
  *B02C 13/288* (2006.01)
  *B02C 13/10* (2006.01)

(52) U.S. Cl.
  CPC .......... *B02C 13/286* (2013.01); *B02C 13/288* (2013.01); *B02C 13/10* (2013.01); *B02C 2013/28672* (2013.01)

(58) Field of Classification Search
  USPC .......................... 241/33, 154, 188.1, 194, 56
  See application file for complete search history.

(56) References Cited

U.S. PATENT DOCUMENTS

| | | | | |
|---|---|---|---|---|
| 2,695,755 A * | 11/1954 | Denovan | ................. | B02C 13/14 241/154 |
| 2,700,512 A * | 1/1955 | Denovan | ................. | B02C 13/14 241/154 |
| 2,963,230 A * | 12/1960 | Lykken | .................. | B02C 13/14 209/139.2 |
| 3,062,459 A * | 11/1962 | Dearing | .................. | B02C 13/14 241/102 |
| 3,210,015 A * | 10/1965 | Tollemache | ............ | B02C 13/14 209/642 |
| 3,249,424 A * | 5/1966 | Phillips | ............... | C22B 21/0046 266/122 |
| 3,329,350 A * | 7/1967 | Wisgerhof | .............. | B02C 13/18 241/187 |
| 3,356,016 A * | 12/1967 | Eidal | .................. | B02C 13/1835 100/140 |
| 3,608,842 A * | 9/1971 | Engler | .................... | B02C 18/18 241/194 |
| 3,970,255 A * | 7/1976 | Foster | .................... | B02C 13/14 241/185.5 |
| 3,987,970 A * | 10/1976 | Burkett | .................. | B02C 13/18 241/43 |
| 3,993,256 A * | 11/1976 | Brewer | .................. | B02C 13/16 241/186.5 |
| 4,134,552 A * | 1/1979 | Fraser | ..................... | B02C 13/31 241/33 |
| 4,240,590 A * | 12/1980 | Lautenschlager | ....... | B02C 13/08 241/188.1 |
| 4,304,361 A * | 12/1981 | Campbell | ............. | B02C 13/288 241/24.21 |
| 4,493,459 A * | 1/1985 | Burkett | ................. | B02C 13/282 241/152.2 |
| 4,637,561 A * | 1/1987 | Edberg | ................... | B02C 13/16 241/154 |
| 4,641,792 A * | 2/1987 | Villavicencio | ........... | D01B 1/00 19/26 |
| 4,651,757 A * | 3/1987 | Ohyatsu | .................. | A24C 5/36 131/96 |
| 4,690,338 A * | 9/1987 | Sayler | ..................... | B02C 13/18 241/154 |
| 4,747,550 A * | 5/1988 | Jackering | ................ | B02C 13/14 241/55 |
| 4,805,842 A * | 2/1989 | Vander Jagt | ............ | B02C 13/28 241/194 |
| 4,856,716 A * | 8/1989 | Burstedt | ................. | B02C 2/047 241/30 |
| 4,875,630 A * | 10/1989 | Carlson | ................. | A01D 51/00 241/56 |
| 5,082,188 A * | 1/1992 | Urich | ..................... | B02C 13/02 241/101.761 |
| 5,083,714 A * | 1/1992 | Vendelin | ............... | B02C 13/286 241/275 |
| 5,163,202 A * | 11/1992 | Kawakami | ............... | A47L 9/2815 15/319 |
| 5,240,188 A * | 8/1993 | Whitmire | ............... | A01G 3/002 241/101.2 |
| 5,351,035 A * | 9/1994 | Chrisco | .................. | B01D 46/46 116/DIG. 25 |
| 5,680,994 A | 10/1997 | Eide et al. | | |
| 5,685,498 A * | 11/1997 | McCoy | ................... | B02C 13/18 241/24.14 |
| 5,697,563 A * | 12/1997 | Fujimoto | ................ | B02C 13/16 241/102 |
| 5,732,894 A * | 3/1998 | Sheahan | ................. | B02C 13/18 241/154 |
| 5,927,623 A * | 7/1999 | Ferguson | ................ | B02C 2/045 241/207 |
| 6,065,697 A * | 5/2000 | Engel | ..................... | B02C 13/18 241/188.1 |
| 6,325,306 B1 * | 12/2001 | Gacanich | ................ | B02C 13/18 241/15 |
| 6,360,975 B1 * | 3/2002 | Csendes | .................. | B01D 53/00 241/19 |
| 8,777,142 B2 * | 7/2014 | Gronholz | ................ | B02C 13/14 241/188.1 |
| 2006/0124787 A1 * | 6/2006 | Schweiger | ............. | B02C 13/16 241/89.3 |
| 2007/0069052 A1 * | 3/2007 | Smith | .................... | B02C 13/12 241/60 |
| 2008/0251618 A1 * | 10/2008 | Gronholz | ................ | B02C 13/14 241/157 |
| 2009/0261191 A1 * | 10/2009 | Eriksen | ................. | B02C 13/286 241/189.1 |
| 2009/0294559 A1 * | 12/2009 | Eriksson | ................ | B02C 2/047 241/30 |
| 2010/0181396 A1 * | 7/2010 | Hedin | ..................... | B02C 2/047 241/25 |
| 2010/0181397 A1 * | 7/2010 | Wallin | .................... | B02C 1/02 241/30 |
| 2011/0186664 A1 * | 8/2011 | Lucas | .................... | B02C 13/00 241/38 |
| 2012/0119003 A1 * | 5/2012 | Watts | .................... | B02C 18/12 241/30 |
| 2012/0325949 A1 * | 12/2012 | Gronholz | ................ | B02C 13/14 241/187 |
| 2013/0001337 A1 * | 1/2013 | Sjoberg | .................. | B02C 23/04 241/27 |
| 2013/0233949 A1 * | 9/2013 | Schmandra | ......... | B02C 19/0056 241/18 |
| 2013/0305969 A1 * | 11/2013 | Trebucchi | .............. | B02C 13/14 110/222 |
| 2015/0048187 A1 * | 2/2015 | Gronholz | ................ | B02C 13/14 241/27 |
| 2016/0228879 A1 * | 8/2016 | Scharfe | ................... | B02C 13/16 |
| 2018/0243747 A1 * | 8/2018 | Scharfe | ................... | B02C 13/26 |
| 2018/0339297 A1 * | 11/2018 | Scharfe | ................... | B02C 13/14 |

FOREIGN PATENT DOCUMENTS

| | | |
|---|---|---|
| CN | 202570260 | 12/2012 |
| CN | 202876882 | 4/2013 |
| CN | 103240147 | 8/2013 |
| DE | 1284818 | 12/1966 |
| DE | 3341429 | 6/1984 |
| DE | 102005046207 | 4/2007 |
| EP | 2529835 | 12/2012 |
| JP | S4894069 | 11/1973 |
| JP | 59109253 | 6/1984 |
| JP | 2009509735 | 3/2009 |
| WO | WO2013167398 | 11/2013 |

OTHER PUBLICATIONS

Chinese Office Action dated Feb. 4, 2017 from Chinese patent application No. 201480051953.9.

Office Action dated Jun. 15, 2017 from Japanese Patent Application No. 2016-543352.

Examination Report dated Jul. 18, 2018 from Indian Patent Application No. 201637008597.

* cited by examiner ized or can be controlled. This can, for example, be implemented
COMMINUTING DEVICE

FIELD OF THE INVENTIONS

The present invention concerns a comminuting or stripping device, in particular for metals and mineral substance compounds in ores (in the field of mining), industrial slag containing metal, thermal waste recovery slag containing metal and any other material conglomerates. It is known that various metals and mineral substance compounds are to be found in ores, which, according to the present state of the art, can only be separated from the corresponding ores with a great deal of effort.

BACKGROUND

The efficient extraction of the metals is considerably simplified by totally stripping or separating all the materials occurring in the ores. During the process of smelting the metals, it cannot be avoided that molten metals (e.g. Fe and Cu) get into the slag, due to the melting process, and these are likewise difficult to recover.

Numerous ferrous and non-ferrous metals are to be found in the slags and ashes of thermal waste recovery, as well as the slags of metal production, which are integrated into mineral slags in pure form or heavily scaled. It is only possible to efficiently recover such metals from material conglomerates if these metals are released or separated from their compounds/scaling in such a way that they can subsequently be isolated from the material flow by magnets or non-ferrous metal separators.

According to the prior art, such slag is shredded with conventional hammer and impact mills, and subsequently fed to magnets and non-ferrous metal separators.

Using hammer and impact mills, it is possible, and also efficient, to release and recover metals having a particle size of over 20 mm. In regard to the release of smaller metal particles with such mills, very small gap clearances need to be set, for example under 20 mm, which would lead to a great increase in the mill crushing at the expense of the impact crushing. Said mill crushing would have the consequence that soft non-ferrous metals would be ground in such a way that they could no longer be separated using a non-ferrous metal separator. Thus, it is only possible to recover small metal particles existing in the slag in a pure form with the comminuting devices forming the prior art to a limited extent.

EP 2 529 835 A2 shows a comminuting device with features including features including a comminution chamber having a supply end and a discharge end, which comminution chamber is enclosed by a circular cylindrical and has at least two portions in succession in the axial direction, in each of which at least one rotor is arranged coaxially with the comminution chamber, each rotor having a rotor shaft and having striking tools which extend substantially radially into the comminution chamber at least during operation, the rotors having opposite directions of rotation in at least two successive portions. The comminution chamber also has deflection ribs (48) arranged annularly on the inside of the comminution chamber wall at axial intervals and/or the radius of the comminution chamber wall (42) increasing from top to bottom.

SUMMARY

The task of the invention is therefore to create a device with which it is possible to mechanically release and/or shred and/or separate off pure metal particles and mineral substance compounds integrated into the slag and ores. It should, moreover, be possible to use the invention on material conglomerates made of materials of different density and/or consistencies.

Said problem is solved by a device having features including a delivery cone (12) arranged above the comminution chamber (14) on the supply end that covers the central region of the rotors, an inlet funnel (11) arranged above the delivery cone (12), an inlet area of adjustable size (d) formed between the inlet funnel and the delivery cone, and an air flow device for guiding a particle/air mixture produced in the comminution chamber connected to the comminution chamber, which air flow device has at least one fan rotor (31), which is arranged coaxially with the axis of the comminution chamber and has its own shaft (33), which is driven by its own fan drive so as to rotate the fan rotor independently of the rotors. Advantageous enhancements of the invention are the subject of the sub-claims.

The comminuting and/or separating device in accordance with the invention has an inherently known comminution chamber with a supply end and an outlet end. The comminution chamber is preferably surrounded by a preferably cylindrical, in particular arched, comminution chamber wall, which is usually aligned vertically, wherein the supply end is to be found at the top and the outlet end at the bottom or at the side. Essentially, it is, however, also possible to arrange the axis horizontally, if the equipment is used to prepare only very small material conglomerates, using a horizontal airstream. Otherwise, the material is fed in, in a vertical arrangement, from top to bottom, gravimetrically, and through a fan rotor which comes with its own drive mechanism. The comminuting device in accordance with the invention can be used to separate material conglomerates, however also only for comminuting conglomerates.

The comminution chamber has at least two, preferably three, successive sections in the direction of the cylindrical axis. At least one rotor arranged centrally or concentrically to the comminution chamber, on which striking tools which at least extend radially into the comminution chamber when the device is being operated are arranged, is to be found in each of these sections. Should chains or movable striking tools be used as striking tools, these only extend radially into the comminution chamber if the rotor turns with a corresponding rotational speed. The striking tools serve the purpose of breaking up the material conglomerates in the manner described in further detail—possibly in conjunction with inherently well-known impact bars on the comminution chamber wall yet to be described.

A feed cone, which covers up the rotor shaft, is placed at the supply end via the comminution chamber, so that an even feed of material is achieved solely in the range of action of the striking tools, which is important for a good separation result. A hopper is arranged above the feed cone, in regard to which a lead-in area is formed between the hopper and the feed cone, the size of which (e.g. the width "d") is adjustable or can be controlled. This can, for example, be implemented by means of axial adjustability of the hopper and/or feed cone. In this way, the supply of the material in interaction with that of the control of a fan rotor placed in the outlet area can be controlled in such a way that a desired time for retaining the fine particles in the comminuting device is set, whereby the particle size distribution of the shredded material, and thus also the separation properties of the comminuting device, can be set to various different material conglomerates, very individually. The hopper can also be formed by way of a configuration achieving substantially the same result, which makes it possible for the feedstock to be supplied to the feed cone.

The rotational direction of the rotors in at least two, preferably all, the successive sections is counter-rotational, which leads to high disintegration speeds between the particles to be separated and the striking tools, for it is, in this way, achieved that the particles which are accelerated by the striking tools of a rotor clash frontally with the striking tools turning in the opposite direction in the case of the rotor following in the direction of the material flow. The impact energy is thus the sum of the particle speed and the speed of the striking tools. This results in an extremely high degree of impact energy of the material particles on the subsequent striking tools or on the impact bars on the comminution chamber wall, which leads to the material conglomerates breaking up, as long as materials of different densities and/or consistency, e.g. elasticity, are to be found in them. Finally, the rotational speed of the rotors can, according to the invention, vary between the sections of the supply end and the outlet end of the comminution chamber. In this way it is achieved that the impact energy of the material conglomerates in the area of increasing particle density may increase in the direction of the outlet end, as the rotational speeds of the rotors, and thus the absolute speed of the striking tools, are also increased there.

Deflection ribs are located around the inside of the comminution chamber wall at axial intervals, and/or the radius of the comminution chamber walls increases from the top to the bottom, which leads to the stream of particles not being streamed along the outer wall of the comminution chamber, without getting into the range of action of the striking tools. Such a bypass stream is thus efficiently prevented. These deflection ribs are preferably located in the area of at least two rotors or between the rotors on the comminution chamber wall, whereby the flow of material which falls down on the inside of the comminution chamber is effectively diverted into the range of action of the striking tools. The deflection rib preferably has an upper edge which extends from the outer top area to the inside bottom area, which improves the guiding function of the latter.

An airstream device, for discharging a particle/air mixture from the comminution chamber, is arranged in connection with the comminution chamber, which airstream device possesses at least one comminution chamber coaxially to the axis of the comminution chamber, which is located on its own shaft, driven via a separate fan drive mechanism, in order to rotate the fan rotor independently of the rotors. This makes it possible to feed the particles/air mixture generated in the comminution chamber into and out of the comminution chamber, wherein preferably the speed of the fan, in particular in interaction with controlling the size of the inlet area can also be controlled, for optimum separation of the material conglomerate. The material fed is usually broken up by the striking tools in such a way that a high number of dust particles occur. If the valuable components are contained in these dust particles, the fan can be switched to a high number of revolutions, whereby the "valuable" dust can be conveyed into a settlement tank or flotation, in order to be collected for further preparation. Should the dust rather be the undesired part, the fan can be switched to a low number of revolutions. The valuable components of the material conglomerates can largely be fully exhausted in this way, in regard to which the fine dust escapes or can be supplied to a dust collector. Furthermore, such a clear separation of the components of the material conglomerates can be achieved as was up to now only possible with very much more complex procedures, e.g. chemical processes.

The material particles are, furthermore, compulsorily discharged from the comminution chamber through the airstream appliance after being shredded sufficiently, and thus do not prevent larger particles from being successfully shredded. On the other hand, it is ensured that the small material particles, which sometimes even create dust, are also safely conveyed from the comminution chamber into the preparation area, where they can then be separated off or isolated from the airstream through separators, in particular centrifugal separators, especially cyclones. Following the isolation, a procedural step can be carried out, e.g. a density separation, to separate the content of the ore from the slag, in order to obtain the desired ore content.

An inlet area in the form of a gap having the width "d" is formed between the hopper and the feed cone. In this way, feedstock is fed evenly into the entire area of rotation of the comminution chamber. The areas of the inlet area, i.e. the distance "d" between the hopper and the feed cone, are adjustable. The bulk current supplied in this way can easily be controlled via the width "d" of the inlet area. In addition, through this control of the width "d" of the inlet area between the hopper and the feed cone, the maximum diameter of conglomerates supplied can be limited, which in turn contributes towards increasing the efficiency of the entire piece of equipment. In addition, the airstream in the device can also be controlled by controlling the width of the inlet area. In connection with the control of the fan rotor through electronic control, a particle stream optimally adjusted to suit the purpose can therefore be set. The setting of the inlet area ideally interacts with the individual control of the fan rotor. In this way, the retention times of particles in the comminution chamber, and thus the degree of comminuting, can be set, and even regulated finely.

In order to easily set the size of the inlet area, the hopper is preferably held in an axial direction in such a way that it can be slid. This solution is technically simple to implement, and is very effective.

The inlet area formed between the hopper and the feed cone is at least largely identically constructed around the central axis of the comminution chamber, in order to guarantee an even feed, and thus an even comminuting effect in the entire area of rotation of the comminution chamber.

In an advantageous enhancement of the invention, the device has a control for driving the fan, and a dust sensor is located at the supply end, wherein the fan drive can be controlled, depending on the output signal of the dust sensor. It can thus be achieved that—in so far as it contains valuable components—the dust is supplied to a fine particle recovery plant, e.g. a hutch chamber or flotation chamber. Otherwise, it can be supplied to a dust collector, to implement an environmentally-friendly solution.

It is advantageous in this case if the control and the fan drive permit the fan rotor to be operated at different rotational speeds, and the rotational speed can be regulated, depending upon the output signal of the dust sensor. The stream of particles in the comminution chamber can then be adjusted very accurately to the particle fractions probably to be expected.

In an advantageous enhancement of the invention, the striking tools are placed at various levels on a rotor, offset in relation to one another. This leads to effective and even comminuting of the feedstock.

In an advantageous enhancement of the invention, the rotors have a rotor casing in the sections that go consecutively from the supply end to the outlet end, the radius of which remains constant over the axial length of the comminution chamber. In this way the rotors are protected against the stream of particles moving at high speed, and the stream of particles is limited in a defined manner in the area of the rotors. In this way the rotor casing is preferably likewise covered over by the feed cone, so that the flow of material in this area is reduced.

The rotors preferably have a rotor casing in the form of a cylinder with a constant radius. That means: the radius or the base area of the cylinder is the same in all sections. Such a rotor casing, firstly, prevents material from getting caught in the rotor. Secondly, a cylinder is easy to manufacture. The cylinder can have a polygonal or round, e.g. circular, base area. For reasons of easy cleaning and preventing material from sticking and minimization of wear and tear, a circular base area of the cylinder is appropriate. In the case of an advantageous polygonal base area of the cylinder, a certain amount of leverage can be achieved for the particles, i.e. that particles which fall down on the rotor casing are once again conveyed outwards through the edges of the polygon, into the range of action of the striking tools. The polygonal, e.g. quadratic or star-shaped, base area is therefore appropriate if it is desired to achieve a high degree of comminuting efficiency in an improved interaction with the striking tools.

The rotor casing preferably includes several exchangeable rotor casing components, held on the rotor. When transferring the particles of material into the radial outer region of the comminution chamber, the rotor casing is exposed to a certain degree of wear and tear, so that only the rotor casing elements need to be exchanged, which is considerably cheaper than if the entire rotor had to be replaced. In addition, the rotor casing protects the components of the rotor located further to the inside, e.g. the bearings.

Retaining bars, running axially or on a slant, which divert the flow of material from the rotor casing in the direction of the range of action of the striking tools, are preferably placed on the rotor casing. The retaining bars, which extend into the comminution chamber axially and radially, are preferably formed at least on the second rotor, or the penultimate rotor, in the direction of the material flow. These retaining bars carry material particles with them and accelerate them radially outwards, so that this material can then re-enter the range of action of the striking tools, and can be effectively broken down there.

While it is, essentially, possible to use a drive mechanism for the rotors and provide for the direction of rotation in the opposite direction and different rotational speeds via corresponding gears, it is to be preferred that every rotor has its own drive mechanism, which can be operated or controlled independently of the other rotors. In this way, the rotational speeds can be individually adjusted to different material conglomerates to be released, which, with a single drive for all rotors, could only be implemented in a more complex way.

The striking tools are preferably detachable or can be exchanged through a fastening device formed on the rotor, as a result of which they can be exchanged easily.

The fastening device preferably includes plates that are concentric to one another, which are firmly arranged at an axial distance to one another on the rotor, which plates have holes that are concentric to one another, which can be penetrated by bolts, which in turn pass through recesses in the mounting portion of the striking tools. The mounting portion of the striking tools may therefore, for example, contain a recess or a hole, which is penetrated by the bolt between two plates. The mounting portion of the striking tool may therefore, for example, be formed by at least one chain link or a perforation. This makes it possible to fasten the striking tools on the rotor in such a way that they can easily be detached.

The fastening device preferably has at least two receptacles for the striking tools, axially offset in relation to one another. In this way striking tools can be axially offset in relation to one another, but fastened to the rotor so that they overlap in the circumferential direction, which produces a high degree of comminuting efficiency.

The striking tools are preferably formed, in a known manner, by means of chains and/or baffle plates. These are manufactured on an industrial scale and can be obtained on the market at low cost.

In an advantageous enhancement of the invention, at least one rotor following in the feed direction of the material has more striking tools than the rotor placed before it. Thus, the frequency of particle collisions with striking tools in the lower high-energy range in which the rotors turn at a high speed is increased, which assists the process of breaking open virtually all material conglomerates.

In an advantageous enhancement of the invention, an even base is arranged underneath the comminution chamber, at the outlet end. This is preferably formed directly underneath the fan, so that, through the fan, the shredded material can be discharged radially into desired preparation and disposal areas. Thus, a fine particle recovery plant can be connected to the outlet end of the device, e.g. to a hutch chamber or a cyclone, making it possible to recover "valuable" dust for further preparation. Naturally, a dust collector can also be connected at the outlet end of the device, in order, for example, to collect dust for disposal or for preparing the airstream.

In an advantageous enhancement of the invention, the fine particle recovery plant or the dust collector can, optionally, be connected with the outlet end via a controlled guiding mechanism, which makes it possible to easily control the material flow in line with the individual requests for preparing different particle fractions. This solution can be implemented particularly easily with an even base, as described above.

The guiding mechanism can preferably be controlled via the signal of the dust sensor. In this way, both the inlet area and the fan and also the discharge of particles can be controlled with the dust sensor.

Preferably, impact bars that are either axial or on a slant are arranged on the comminution chamber wall, onto which the flow of material impacts and which divert the flow of material from the comminution chamber wall back in the direction of the sphere of influence of the striking tools, so that this material then re-enters the range of action of the striking tools and can be effectively broken down there.

The radius of the comminution chamber wall is constant, or preferably increasing from the supply end towards the outlet end, which leads to the particles not collecting in the area of the comminution chamber wall, but always falling back into the area of the striking tools, where they are broken down further. In principle, the radius of the comminution chamber wall may even decrease, which may, however, be problematic, due to an increasing risk of congestion. Should the radius of the comminution chamber wall increase downwards, the increase may occur continuously or in stages.

At least if it is cylindrical, the comminution chamber wall contains deflection ribs around it, with which the material flow is diverted from the comminution chamber wall into the range of action of the striking tools. A high degree of efficiency in separating the material conglomerates is achieved in this way. As an alternative or in addition to the deflection ribs, the diameter of the comminution chamber may also increase from the inlet end (or also the supply end) to the outlet end, as a result of which the material stream is also diverted into the direction of the range of action of the striking tools, through the gravity and stream of forced air.

The combination of the technical features explained above thus leads, firstly, to the impact energy of the material conglomerates increasing towards the outlet end, and simultaneously the particle density, which should ultimately lead to the material conglomerates coming into contact with the striking tools and impact bars with a high degree of impact energy in the last section prior to them being discharged from the comminution chamber, which leads to the material conglomerates being scattered, without them being ground up, as is the case in the prior art. The size of the metal particles contained in the material conglomerates is thus not reduced. The resulting fine particles of material are inevitably conveyed through an additional airstream device in the direction of the outlet end of the comminution chamber into a preparation area, in which the particles of material are isolated from the airstream, whereby the retention time of the fine particles of material in the comminution chamber can be regulated via the airstream device. Preferably centrifugal separators, e.g. cyclones, are suitable for this purpose.

The device of the invention thus permits effective comminuting, separation or release, e.g. of metals and mineral compounds contained in ores or Fe or non-ferrous metals from slag or scaling, which is scarcely possible by the known devices in accordance with the prior art. In this respect, the invention makes use of a construction which leads to the impact energy of the material conglomerates to be released onto striking tools and/or impact bars in the comminution chamber being maximized, without the metal components themselves being shredded in the process. Thus, even the smallest components of material in composites can still be economically expediently isolated. Thus, the highest degree of impact energy from material conglomerates to be separated is achieved with the invention, which, even in the case of only a slight grinding effect, leads to the material conglomerates being broken up and released.

In addition, one aspect of the invention consists in increasing the kinetic energy of as many material particles in the comminution chamber as possible in such a way that it can be achieved that the material particles or material conglomerates are, at a certain level of impact energy, impacted with striking tools or impact bars. The applicant has found out that such impact energy leads to the material conglomerates being broken up in a relatively safe manner, without the metal components themselves being crushed a lot.

In order to increase the number of interactions of material particles or material conglomerates in the comminution chamber, impact rails can be formed on the comminution chamber wall, or the number of striking tools which extend inwards axially and radially can be increased. Following the acceleration by means of the striking tools, material particles will bounce against these impact bars and then break up.

The invention is explained below based on a comminution chamber with three sections. It does, however, need to be clarified that the invention also works in the same way with two sections, or also with four or more sections. The axial comminution chamber sections correspond to the axial regions of the rotors.

In the case of the rotors following in the feed direction of the material the striking tools can be arranged as a constant or differing number. Thus, in the case of the first rotor, for example, i.e. the rotor in the first section, the number of striking tools can be even lower, as the task of this section consists in conveying the particles of material radially outwards, so that they are directed into the range of action of the striking tools of the subsequent rotors, on which there are already more striking tools arranged then on the first rotor. Retaining bars can, moreover, be formed on the rotor casing of the first rotor, in order to effectively convey the particles of material in the radial external area of the comminution chamber.

Optionally, noticeably more striking tools can be placed on the second rotor, i.e. the rotor in the second section, than on the first rotor. The purpose of the striking tools is to accelerate the material particles increasingly existing in a greater density outwards and downwards, in the direction of the outlet end. The rotor casing of the second rotor may also have retention bars or a polygonal base, in order to convey the particles into the area located radially outwards, where they are heavily accelerated in the direction of the third rotor by the numerous striking tools in the acceleration chamber.

Preferably most of the striking tools are placed on the third rotor, i.e. on the rotor in the third section prior to the outlet, and these serve the purpose of being more likely to break up the greatly accelerated material particles.

The increasing number of striking tools in the consecutive sections, as well as the increasing rotational speed in the consecutive sections, in conjunction with the opposite rotational direction, thus leads, in all transitional areas, from one section to the next to a maximization of the impact energy, which leads to an effective mechanical release of the material conglomerates. The materials conglomerates broken down into the individual components can subsequently be separated from one another, after they have been discharged from the comminution chamber into inherently known separation or comminuting devices, such as flotations, wind separators, magnetic separators, etc.

In order to implement a maximization of the impact energy of the metal particles in the comminution chamber, as well as to ensure the impact of a metal particle on a striking tool, it has proven to be advantageous to attach the striking tools from top to bottom, offset in relation to one another per each rotor (see FIG. 2).

The rotor speeds (rotational speeds) may, in this example, amount in the three sections, from top to bottom, to 800, 1200 and 1500 revolutions/min. respectively, wherein the rotors in the first and second sections rotate in the same direction, and in the second and third sections in the opposite direction to one another. The absolute speed of the striking tools in the outer area of the third section (high-speed impact chamber) is thus over 150 m/s. That means that, in conjunction with the counter-acceleration of the particles in the pre-treatment chamber and the acceleration chamber, impact speeds of over 200 m/s can be achieved.

The impact energy is calculated by the rotational speed of a rotor in conjunction with the weight of a striking tool and the diameter of the comminution chambers. In other words: In order to achieve optimum comminuting or release (particle size or also grain size) different rotational speeds are tested, to achieve the impact energy required.

In this way the impact speed, and thus the impact energies of the metal particles when coming into contact with the striking tools and/or impact bars in the comminution chamber is maximized within the limits of what is physically possible and expedient.

The striking tools are designed in an inherently known way, as is shown, for example, by DE 10 2005 046 207. They can therefore be formed out of chains and/or baffle plates, or out of combinations of such elements. Ultimately, the design of the striking tools is not relevant to the invention.

The striking tools are preferably hinged to the rotors in such a way that they always remain in their horizontal position. Therefore no high rotational speeds are necessary (as is the case with conventional chains) to bring the striking tools into the horizontal position. In addition, as a result, multiple striking tools can be placed on a rotor, offset from one another, because they no longer hang down when the machine is switched off, possibly getting tangled up in the process. The movable configuration of the striking tools in such a way that they can only be moved on a plane on a normal axis to the cylindrical axis of the comminution chamber, is therefore highly advantageous. It can also be provided for that the striking tools are at least fixed to the rotors in an almost rigid way.

Of course, the invention is not only limited to the use of metal particles in slag, but can also be used on all kinds of material conglomerates consisting of materials of differing densities or elasticity.

If the rotor of each section has its own drive mechanism, the rotors can be driven separately via shafts that are concentric to one another via drive mechanisms placed at one end of the comminution chamber, or the drive mechanisms can be located radially within the rotor casings of the corresponding rotors, in particular in the form of external rotor motors.

Both the comminution chamber wall and the striking tools and rotor casing preferably consist of hard, impact-resistant materials, such as metal or ceramic metal composites. The rotor casing and the comminution chamber wall can optionally be lined with wear plates.

BRIEF DESCRIPTION OF THE DRAWINGS

The invention is described below, for example, based on the schematic drawing. The following is shown there.

DETAILED DESCRIPTION OF THE INVENTIONS

Figure 1:
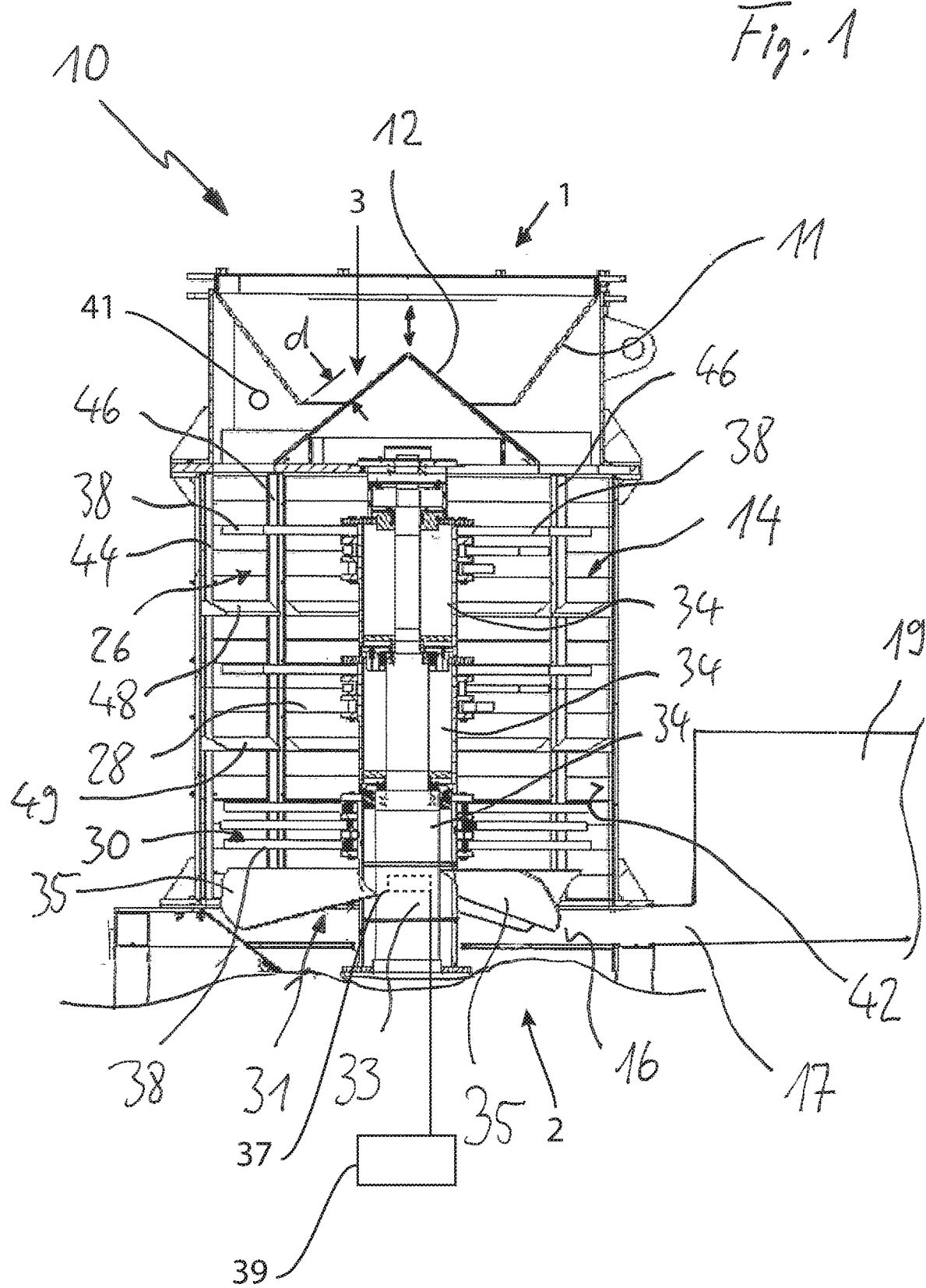
FIG. 1 A longitudinal section through a mechanical comminuting device of the invention with three rotors.

FIG. 1 shows a material comminuting and separation device 10, which has an inlet end 1, a discharge end 2, a hopper 11 and an feed cone 12, which are arranged on a cylindrical comminution chamber 14. The gap "d" between the hopper 11 and the feed cone 12, defining an inlet area 3, can be adjusted using a height adjustment system of the hopper (not shown) in the direction of the cylindrical axis of the comminution chamber. Both bring about a controlled homogeneous supply of material to the entire range of action of the comminuting device, without damaging or wearing down its components, i.e. a complete 360° feeder area in regard to the cylindrical comminution chamber. A horizontal distribution tray 16, from which a passage 17 leads into a hutch chamber 19, is placed under the comminution chamber. The hopper 11, feed cone 12, comminution chamber 14 and distribution tray 16 are connected with one another and rest on a frame 18 schematically shown in FIG. 1. The cylindrical comminution chamber 14 is arranged vertically with its axis. Three concentric shafts are provided for in the center of the comminution chamber 14, with which a first rotor 26, a second rotor 28 located beneath it and a lower-most third rotor 30 at the outlet end are connected. As can in particular also be inferred from the perspective representation in FIG. 2, these three concentric shafts are driven by separate drive mechanisms, which are, in the present example, not shown, but which are inherently known. The drive mechanisms allow for the three rotors 26, 28 and 30 to be controlled separately by means of gear wheels 20, 22 and 24, with a desired rotational direction and desired rotational speed. Each rotor has a cylindrical rotor casing 34, the diameter of which is identical in the case of all three rotors 26, 28 and 30. Each rotor furthermore contains a fastening device 36 for striking tools 38, which are fastened to the fastening device 36 of the rotors 26, 28 and 30. The striking tools 38 remain in a horizontal position, i.e. transverse to the rotor axis, independent of the rotation of the rotors.

A fan rotor 31 rotating coaxially to the rotor axis, which has fan blades 35, which are mounted on a separate shaft 33, which is driven via its own fan drive mechanism is located underneath the rotors 26, 28 and 30 as an airstream device. Thus, the fan rotor 31 can be operated independently of the rotors 26, 28 and 30, preferably also its rotational speed. The fan rotor 31 is driven via a separate gear wheel 25. A control system 39 for the fan drive 37 is operable to control the fan drive in response to signal from a dust sensor 41 which is arranged on the supply end. The fan drive can be controlled as a function of an output signal of the dust sensor. The control system 39 and the fan drive 37 allow operation of the fan rotor 31 at different rotational speeds, in that the rotational speed can be controlled as a function of the output signal of the dust sensor 41. Together, the fan, fan rotor 31, fan drive 37, fan control 39 and dust sensor 41 comprise the air stream device.

The distribution tray 16, from which the shredded particles are conveyed into the hutch chamber 19 via the passage 17 by means of the fan rotor 31, is located directly underneath the fan rotor 31. Instead of or in additionally in another sector of the distribution tray, another device for separating material, e.g. a gravity separator, a rotational separator, e.g. a cyclone, may also be placed above a further passage 17.

The construction of the comminution chamber 14 can, moreover, be seen in detail in FIG. 1. Accordingly, the comminution chamber 14 contains a cylindrical comminution chamber wall 42, on the inside of which, facing the comminution chamber, wear plates 44, which protect the comminution chamber wall, may be fastened. The wear plates are preferably attached to the comminution chamber wall in such a way that they can be exchanged. Furthermore, impact bars 46 are arranged to run vertically on the inside wall of the comminution chamber 14 at a distance of 45 degrees, which serve as an impacting surface for the material accelerated through the striking tools 38. The comminution chamber 14 may, in the alternative to the circular cylindrical wall, have a conical, downwardly widened comminution chamber wall (42).

Deflection ribs 48, 49 are preferably provided for all the way round at a level in the area of the first and second rotors, which are in particular placed in a circular formation on the inside of the comminution chamber wall 42 and serve to guide the flow of material from the comminution chamber wall 42 into the range of action of the striking tools 38.

Figure 2:
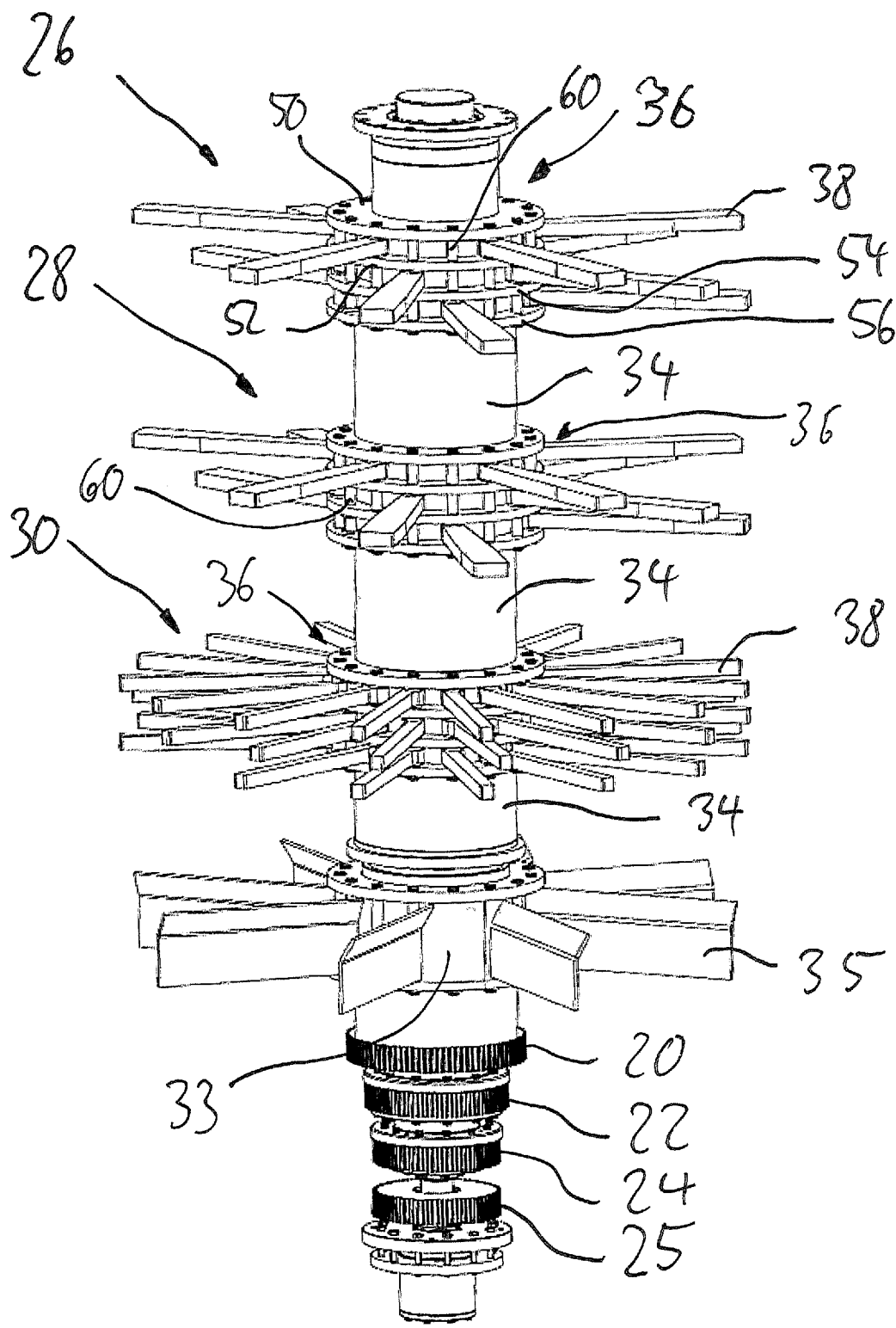
FIG. 2 A perspective view of an axis with three rotors and a fan rotor from FIG. 1.

The design of the rotors can be better seen from FIG. 2, which shows a perspective representation of the rotor configuration inserted centrally in FIG. 1.

The fastening device 36 of each rotor 26, 28 and 30 preferably comprises four discs 50, 52, 54 and 56 concentric to one another, which have holes 58 that are concentric to one another. Such concentric holes 58 can be penetrated by bolts 60, which pierce through perforations at the end 26, 28 or 30 of the striking tools 38 facing the rotor, and thus pinpoint the latter on the rotor. The fastening device may, however, also be designed differently.

In the present example, in the case of each rotor 26, 28 and 30 the striking tools 38 can be established at three different height positions between the four discs 50, 52, 54 and 56. Even though the rotors 26, 28 and 30 are also provided for identically in the present embodiment, it may also be provided for that the rotors located further down have an increasing number of options for attaching the striking tools or that there are more striking tools suspended from the lower rotors than the upper rotors, as shown in the example. For example, more concentric discs could be constructed on the lower rotors, and less concentric discs on the upper rotors. It is, in any event, worthwhile for the density of the striking tools in the lower separating comb area, where high particle speeds prevail, to be greater, whereby the efficiency of the equipment is improved.

In the present embodiment, baffle plates 38 are provided for, which are attached to the fastening device 36 of the rotors 26, 28 and 30. Instead of baffle plates, link chains or other inherently common striking tools can also be used. When the rotor is still, the striking tools are usually suspended and are pressed outward by the rotational force with an increasing rotational speed, until they attain the operational orientation shown in the figure, in which they point radially outwards from the rotor 26, 28 or 30 respectively in the direction of the comminution chamber 42.

The comminuting mechanism in the comminuting and separation chamber can be set via the rotors 26, 28 and 30, while the flow conditions, and thus also the retention times of the ultrafine particles in the comminution chamber can be set via the gap "d" between the hopper and the feed cone, as well as via the control of the fan rotor 31. As a result, in order to ensure optimum separation of the components contained in the material conglomerate, it is possible to control the comminuting and separation device in such a way that it is customized for specific material conglomerates.

The functioning of the material comminuting device is explained briefly below:

Material to be separated, e.g. ores containing metal, industrial slag containing metal or slag with metal inclusions, is supplied in a controlled way via the hopper 11 and the feed cone 12, namely by adjusting the gap "d" by means of vertical adjustment of the hopper 12 of the comminution chamber 14 of the comminuting device 10. The coarse material there initially falls down due to its heavy weight, and, in the course of the increasing comminuting in the comminuting device 10, is sucked up by the fan rotor 31 in the direction of the distribution tray, where it is blown from the distribution tray 16 in the direction of further preparation, e.g. a hutch chamber 19, a density separation or rotational separation device (e.g. a cyclone).

The rotors 26, 28 and 30 preferably always rotate in opposite directions to one another, i.e. with alternating rotational directions, wherein the rotational speed can preferably increase from top to bottom. The rotational speed of the upper rotor may, for example, amount to 800 revolutions/min, while the middle rotor turns at 1200 revolutions/min and the lower rotor at 1500 revolutions/min. The material that trickles down is partly shredded by the striking tools 38 on the uppermost first rotor 26, and partly accelerated in the circumferential direction of the rotor. The material either collides with the impact bars 46 or the striking tools 38 of the middle rotor 28 turning in the opposite direction, where the particles of material now, due to the prior acceleration by the upper rotor in the opposite direction, collide at a higher speed, as a result of which the comminuting effect is significantly increased. In addition, also in the case of the middle, second rotor, the rotational speed may be greater than in the case of the first rotor 26, so that, also in this case, the impact on the particles of material is greater than in the case of the upper rotor. In addition, the material particles strike the impact bars 46 running vertically, and are likewise shredded there. Material which trickles down in the area of the comminution chamber wall 42 is re-conveyed by the deflection ribs 48 back into the area located further inwards of the comminution chamber 14 radially, where it is guided to the range of action of the striking tools 38. Since the striking tools on each rotor are placed at various heights (see FIG. 3), a very high likelihood of each particle of material colliding with a striking tool is achieved, with makes for good efficiency of the device.

The lowest, third rotor 30 in the outlet area can rotate at the highest speed. Also in this case it is to be borne in mind that, through the middle, second rotor 28, the material particles are subjected to a greater acceleration in the opposite direction, so that the particles now collide with the lower rotor 30, turning in the opposite direction, at a correspondingly increased counter-speed. Preferably most of the striking tools 38 are located in the area of the lower rotor 30, so that there is a high likelihood here of particles colliding with striking tools 30 or with the vertical impact bars 46. This leads to a very effective comminuting of material.

The invention is not limited to the present embodiment, but variations are possible within the scope of protection of the following claims.

Very high amounts of impact energy of material conglomerates to be separated against the striking tools are achieved with the invention, wherein the particles broken up can be effectively conveyed for further preparation. In addition, the material separation can be controlled by effectively regulating the material flow, in particular the flow of ultrafine particles.

In particular, the number and distribution of the striking tools may differ from the example shown. Various different striking tools, such as chains and baffle plates, may be used. Very many more striking tools may be distributed over the circumference in the area of the lowest rotor than in the areas further up. This leads, in the area of the third section, to an increased likelihood of collisions.

The comminution chamber wall can have a sector which can be opened, in order to make access to the comminution chamber possible, for example, for undertaking maintenance work. Consumable parts, such as the striking tools 38 or the wear plates 44, can thus be much more easily exchanged.

The invention claimed is:

1. A device (10) for mechanically comminuting material conglomerates comprising:
   a comminution chamber (14) having a supply end and a discharge end, which comminution chamber is enclosed by a comminution chamber wall (42) and has at least two portions in succession in the axial direction, in each of which at least one rotor (26, 28, 30) is arranged coaxial with the comminution chamber, each of said at least one rotor having a rotor shaft and having striking tools (38) which extend substantially radially into the comminution chamber at least during operation, the rotors (26, 28, 30) having opposite directions of rotation in at least two successive portions, deflection ribs (48) being arranged annularly on the inside of the comminution chamber wall, characterized in that a delivery cone (12) is arranged above the comminution chamber (14) on the supply end and covers the central region of the rotors, in that an inlet funnel (11) is arranged above the delivery cone (12), an inlet area of adjustable size (d) being formed between the inlet funnel and the delivery cone, and in that an air stream device for guiding a particle/air mixture produced in the comminution chamber is arranged connected to the comminution chamber, which air stream device has at least one fan rotor (31), which is arranged coaxially with the axis of the comminution chamber and has its own shaft (33), which is driven by its own fan drive so as to rotate the fan rotor independently of the rotors.

2. The device according to claim 1, characterized in that the distance (d) between the inlet funnel and the delivery cone is adjustable.

3. The device according to claim 2, characterized in that the inlet funnel (11) is arranged coaxial with the central axis of the comminution chamber so as to be displaceable in the axial direction.

4. The device according to claim 3, characterized in that the inlet area formed between the inlet funnel (11) and the delivery cone (12) is formed at least substantially identically about the central axis of the comminution chamber (14).

5. The device according to claim 2, characterized in that the inlet area formed between the inlet funnel (11) and the delivery cone (12) is formed at least substantially identically about the central axis of the comminution chamber (14).

6. The device according to claim 1, further comprising: a control system for the fan drive, and in that a dust sensor is arranged on the supply end, and the fan drive is controllable as a function of an output signal of the dust sensor.

7. The device according to claim 6, characterized in that the control system and the fan drive allow operation of the fan rotor (31) at different rotational speeds, and in that the rotational speed is controllable as a function of the output signal of the dust sensor.

8. The device according to claim 1, characterized in that the striking tools (38) are arranged offset from one another in a plurality of planes.

9. The device according to claim 1, characterized in that, in the portions in succession from the supply end to the discharge end, the rotors (26, 28, 30) have a rotor casing (34), the radius of which remains constant over the axial length of the comminution chamber.

10. The device according to claim 1, characterized in that each rotor (26, 28, 30) has its own drive which is controllable independently of the other rotors.

11. The device according to claim 1, characterized in that each striking tool is releasably fastened to a rotor.

12. The device according to claim 1, characterized in that a first of the least one rotors has more striking tools than a second of the least one rotors, wherein said second of the least one rotors is located between said first of the least one rotors and the supply end.

13. The device according to claim 1, characterized in that a planar distributor plate (16) is arranged below the comminution chamber on the outlet side.

14. The device according to claim 1, characterized in that axially or obliquely extending deflector strips (46) are arranged on the comminution chamber wall.

15. A device (10) for mechanically comminuting material conglomerates comprising:

a comminution chamber (14) having a supply end and a discharge end, which comminution chamber is enclosed by a chamber wall (42) and has at least two portions in succession in the axial direction, in each of which at least one rotor (26, 28, 30) is arranged coaxial with the comminution chamber, each of said at least one rotor having a rotor shaft and having striking tools (38) which extend substantially radially into the comminution chamber at least during operation, the rotors (26, 28, 30) having opposite directions of rotation in at least two successive portions, deflection ribs (48) being arranged annularly on the inside of the comminution chamber wall, characterized in that a delivery cone (12) is arranged above the comminution chamber (14) on the supply end and covers the central region of the rotors, an inlet funnel (11) is arranged above the delivery cone (12), an inlet area of adjustable size (d) being formed between the inlet funnel and the delivery cone, and an air stream device for guiding a particle/air mixture produced in the comminution chamber is arranged connected to the comminution chamber, which air stream flow device has at least one fan rotor (31), which is arranged coaxially with the axis of the comminution chamber and has its own shaft (33), which is driven by its own fan drive so as to rotate the fan rotor independently of the rotors, and and in that a dust sensor is arranged on the supply end, and the fan drive is controllable by a control system as a function of an output signal of the dust sensor.

16. The device according to claim 15, characterized in that the control system and the fan drive allow operation of the fan rotor (31) at different rotational speeds, and in that the rotational speed is controllable as a function of the output signal of the dust sensor.

17. A device (10) for mechanically comminuting material conglomerates comprising:

a comminution chamber (14) having a supply end and a discharge end, which comminution chamber is enclosed by a chamber wall (42) and has at least two portions in succession in the axial direction, in each of which at least one rotor (26, 28, 30) is arranged coaxial with the comminution chamber, each of said at least one rotor having a rotor shaft and having striking tools (38) which extend substantially radially into the comminution chamber at least during operation, the rotors (26, 28, 30) having opposite directions of rotation in at least two successive portions, deflection ribs (48) being arranged annularly on the inside of the comminution chamber wall; characterized in that an air stream device for guiding a particle/air mixture produced in the comminution chamber is arranged connected to the comminution chamber, which air stream device has at least one fan rotor (31), which is arranged coaxially with the axis of the comminution chamber and has its own shaft (33), which is driven by its own fan drive so as to rotate the fan rotor independently of the rotors, and and in that a dust sensor is arranged on the supply end, and the fan drive is controllable by a control system as a function of an output signal of the dust sensor.

18. The device according to claim 17, characterized in that the control system and the fan drive allow operation of the fan rotor (31) at different rotational speeds, and in that the rotational speed is controllable as a function of the output signal of the dust sensor.

\* \* \* \* \*